(12) United States Patent
Oehring et al.

(10) Patent No.: US 10,731,561 B2
(45) Date of Patent: *Aug. 4, 2020

(54) TURBINE CHILLING FOR OIL FIELD POWER GENERATION

(71) Applicant: U.S. Well Services, LLC, Houston, TX (US)

(72) Inventors: Jared Oehring, Houston, TX (US); Brandon N. Hinderliter, Houston, TX (US)

(73) Assignee: U.S. Well Services, LLC, Houston, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 15/994,759

(22) Filed: May 31, 2018

(65) Prior Publication Data

US 2018/0274446 A1    Sep. 27, 2018

Related U.S. Application Data

(63) Continuation of application No. 15/486,970, filed on Apr. 13, 2017, now Pat. No. 9,995,218, which is a (Continued)

(51) Int. Cl.
*E21B 43/26* (2006.01)
*F02C 7/143* (2006.01)
(Continued)

(52) U.S. Cl.
CPC .............. *F02C 7/143* (2013.01); *E21B 43/26* (2013.01); *F01D 15/08* (2013.01); *F01D 15/10* (2013.01);
(Continued)

(58) Field of Classification Search
CPC ....................................................... E21B 43/26
See application file for complete search history.

(56) References Cited

U.S. PATENT DOCUMENTS

| 1,656,861 A | 1/1928 | Leonard |
| 1,671,436 A | 5/1928 | Melott |

(Continued)

FOREIGN PATENT DOCUMENTS

| AU | 2007340913 | 7/2008 |
| CA | 2406801 | 11/2001 |

(Continued)

OTHER PUBLICATIONS

Non-Final Office Action dated Oct. 4, 2018 in related U.S. Appl. No. 15/217,081.
(Continued)

*Primary Examiner* — Kenneth L Thompson
(74) *Attorney, Agent, or Firm* — Hogan Lovells US LLP

(57) ABSTRACT

A hydraulic fracturing system for fracturing a subterranean formation is disclosed. In an embodiment, the system may include a plurality of electric pumps configured to pump fluid into a wellbore associated with a well at a high pressure; at least one turbine generator electrically coupled to the plurality of electric pumps so as to generate electricity for use by the plurality of electric pumps, each turbine generator having at least one air intake channel; and an air chiller system associated with the at least one turbine generator, the air chiller system comprising: a chiller unit configured to chill a fluid; and at least one coil in fluid communication with the chiller unit and positioned adjacent to the at least one air intake channel, wherein the air chiller system is configured to increase a power output of the at least one turbine generator.

18 Claims, 7 Drawing Sheets

Related U.S. Application Data continuation-in-part of application No. 15/235,788, filed on Aug. 12, 2016, which is a continuation-in-part of application No. 15/202,085, filed on Jul. 5, 2016, now Pat. No. 10,337,308, which is a continuation of application No. 13/679,689, filed on Nov. 16, 2012, now Pat. No. 9,410,410.

(60) Provisional application No. 62/323,236, filed on Apr. 15, 2016.

(51) Int. Cl.

| | |
|---|---|
| *F04B 47/02* | (2006.01) |
| *F04B 17/03* | (2006.01) |
| *F02C 7/16* | (2006.01) |
| *H02K 7/18* | (2006.01) |
| *F01D 15/08* | (2006.01) |
| *F01D 15/10* | (2006.01) |
| *F04B 23/04* | (2006.01) |
| *F04B 35/04* | (2006.01) |
| *F04B 47/00* | (2006.01) |
| *F04B 49/20* | (2006.01) |
| *F04B 19/22* | (2006.01) |

(52) U.S. Cl.
CPC ............... *F02C 7/16* (2013.01); *F04B 17/03* (2013.01); *F04B 19/22* (2013.01); *F04B 23/04* (2013.01); *F04B 35/04* (2013.01); *F04B 47/00* (2013.01); *F04B 47/02* (2013.01); *F04B 49/20* (2013.01); *H02K 7/1823* (2013.01); *F05D 2220/76* (2013.01); *F05D 2260/213* (2013.01)

(56) References Cited

U.S. PATENT DOCUMENTS

| | | | |
|---|---|---|---|
| 2,004,077 A | 6/1935 | McCartney |
| 2,183,364 A | 12/1939 | Bailey |
| 2,220,622 A | 11/1940 | Aitken |
| 2,248,051 A | 7/1941 | Armstrong |
| 2,407,796 A | 9/1946 | Page |
| 2,416,848 A | 3/1947 | Rothery |
| 2,753,940 A | 7/1956 | Bonner |
| 3,061,039 A | 10/1962 | Peters |
| 3,066,503 A | 12/1962 | Fleming |
| 3,302,069 A | 1/1967 | Webster |
| 3,334,495 A | 8/1967 | Jensen |
| 3,722,595 A | 3/1973 | Kiel |
| 3,764,233 A | 10/1973 | Strickland |
| 3,773,140 A | 11/1973 | Mahajan |
| 3,837,179 A | 9/1974 | Barth |
| 3,849,662 A | 11/1974 | Blaskowski |
| 3,881,551 A | 5/1975 | Terry |
| 4,037,431 A | 7/1977 | Sugimoto |
| 4,100,822 A | 7/1978 | Rosman |
| 4,151,575 A | 4/1979 | Hogue |
| 4,226,299 A | 10/1980 | Hansen |
| 4,265,266 A | 5/1981 | Kierbow et al. |
| 4,432,064 A | 2/1984 | Barker |
| 4,442,665 A | 4/1984 | Fick et al. |
| 4,456,092 A | 6/1984 | Kubozuka |
| 4,506,982 A | 3/1985 | Smithers et al. |
| 4,512,387 A | 4/1985 | Rodriguez |
| 4,529,887 A | 7/1985 | Johnson |
| 4,538,916 A | 9/1985 | Zimmerman |
| 4,676,063 A | 6/1987 | Goebel et al. |
| 4,759,674 A | 7/1988 | Schroder |
| 4,793,386 A | 12/1988 | Sloan |
| 4,845,981 A | 7/1989 | Pearson |
| 4,922,463 A | 5/1990 | Del Zotto et al. |
| 5,006,044 A | 4/1991 | Walker, Sr. |
| 5,025,861 A | 6/1991 | Huber et al. |
| 5,050,673 A | 9/1991 | Baldridge |
| 5,130,628 A | 7/1992 | Owen |
| 5,131,472 A | 7/1992 | Dees et al. |
| 5,172,009 A | 12/1992 | Mohan |
| 5,189,388 A | 2/1993 | Mosley |
| 5,366,324 A | 11/1994 | Arlt |
| 5,422,550 A | 6/1995 | McClanahan |
| 5,548,093 A | 8/1996 | Sato |
| 5,590,976 A | 1/1997 | Kilheffer et al. |
| 5,655,361 A | 8/1997 | Kishi |
| 5,736,838 A | 4/1998 | Dove et al. |
| 5,755,096 A | 5/1998 | Holleyman |
| 5,790,972 A | 8/1998 | Kohlenberger |
| 5,865,247 A | 2/1999 | Paterson |
| 5,879,137 A | 3/1999 | Yie |
| 5,894,888 A | 4/1999 | Wiemers |
| 5,907,970 A | 6/1999 | Havlovick et al. |
| 6,138,764 A | 10/2000 | Scarsdale et al. |
| 6,142,878 A | 11/2000 | Barin |
| 6,164,910 A | 12/2000 | Mayleben |
| 6,202,702 B1 | 3/2001 | Ohira |
| 6,208,098 B1 | 3/2001 | Kume |
| 6,254,462 B1 | 7/2001 | Kelton |
| 6,271,637 B1 | 8/2001 | Kushion |
| 6,273,193 B1 | 8/2001 | Hermann |
| 6,315,523 B1 | 11/2001 | Mills |
| 6,477,852 B2 | 11/2002 | Dodo et al. |
| 6,484,490 B1 | 11/2002 | Olsen |
| 6,491,098 B1 | 12/2002 | Dallas |
| 6,529,135 B1 | 3/2003 | Bowers et al. |
| 6,776,227 B2 | 8/2004 | Beida |
| 6,802,690 B2 | 10/2004 | Han |
| 6,808,303 B2 | 10/2004 | Fisher |
| 6,931,310 B2 | 8/2005 | Shimizu et al. |
| 6,936,947 B1 | 8/2005 | Leijon |
| 7,082,993 B2 | 8/2006 | Ayoub |
| 7,104,233 B2 | 9/2006 | Ryczek et al. |
| 7,170,262 B2 | 1/2007 | Pettigrew |
| 7,173,399 B2 | 2/2007 | Sihler |
| 7,308,933 B1 | 12/2007 | Mayfield |
| 7,312,593 B1 | 12/2007 | Streicher et al. |
| 7,336,514 B2 | 2/2008 | Amarillas |
| 7,445,041 B2 | 11/2008 | O'Brien |
| 7,494,263 B2 | 2/2009 | Dykstra et al. |
| 7,500,642 B2 | 3/2009 | Cunningham |
| 7,525,264 B2 | 4/2009 | Dodge |
| 7,563,076 B2 | 7/2009 | Brunet |
| 7,581,379 B2 | 9/2009 | Yoshida |
| 7,675,189 B2 | 3/2010 | Grenier |
| 7,683,499 B2 | 3/2010 | Saucier |
| 7,717,193 B2 | 5/2010 | Egilsson et al. |
| 7,755,310 B2 | 7/2010 | West et al. |
| 7,807,048 B2 | 10/2010 | Collette |
| 7,835,140 B2 | 11/2010 | Mori |
| 7,845,413 B2 | 12/2010 | Shampine |
| 7,926,562 B2 | 4/2011 | Poitzsch |
| 7,894,757 B2 | 7/2011 | Keast |
| 7,977,824 B2 | 7/2011 | Halen et al. |
| 8,037,936 B2 | 10/2011 | Neuroth |
| 8,054,084 B2 | 11/2011 | Schulz et al. |
| 8,083,504 B2 | 12/2011 | Williams |
| 8,096,354 B2 | 1/2012 | Poitzsch |
| 8,096,891 B2 | 1/2012 | Lochtefeld |
| 8,139,383 B2 | 3/2012 | Efraimsson |
| 8,146,665 B2 | 4/2012 | Neal |
| 8,154,419 B2 | 4/2012 | Daussin et al. |
| 8,232,892 B2 | 7/2012 | Overholt et al. |
| 8,261,528 B2 | 9/2012 | Chillar |
| 8,272,439 B2 | 9/2012 | Strickland |
| 8,310,272 B2 | 11/2012 | Quarto |
| 8,354,817 B2 | 1/2013 | Yeh et al. |
| 8,474,521 B2 | 7/2013 | Kajaria |
| 8,534,235 B2 | 9/2013 | Chandler |
| 8,573,303 B2 | 11/2013 | Kerfoot |
| 8,596,056 B2 | 12/2013 | Woodmansee |
| 8,616,005 B1 | 12/2013 | Cousino |
| 8,616,274 B2 | 12/2013 | Belcher et al. |
| 8,646,521 B2 | 2/2014 | Bowen |
| 8,692,408 B2 | 4/2014 | Zhang et al. |
| 8,727,068 B2 | 5/2014 | Bruin |

(56) References Cited

U.S. PATENT DOCUMENTS

| | | |
|---|---|---|
| 8,760,657 B2 | 6/2014 | Pope |
| 8,774,972 B2 | 7/2014 | Rusnak et al. |
| 8,789,601 B2 | 7/2014 | Broussard |
| 8,800,652 B2 | 8/2014 | Bartko |
| 8,807,960 B2 | 8/2014 | Stephenson |
| 8,838,341 B2 | 9/2014 | Kumano |
| 8,851,860 B1 | 10/2014 | Mail |
| 8,857,506 B2 | 10/2014 | Stone, Jr. |
| 8,899,940 B2 | 12/2014 | Laugemors |
| 8,905,056 B2 | 12/2014 | Kendrick |
| 8,905,138 B2 | 12/2014 | Lundstedt et al. |
| 8,997,904 B2 | 4/2015 | Cryer |
| 9,018,881 B2 | 4/2015 | Mao et al. |
| 9,051,822 B2 | 6/2015 | Ayan |
| 9,067,182 B2 | 6/2015 | Nichols |
| 9,103,193 B2 | 8/2015 | Coli |
| 9,119,326 B2 | 8/2015 | McDonnell |
| 9,121,257 B2 | 9/2015 | Coli et al. |
| 9,140,110 B2 | 9/2015 | Coli et al. |
| 9,160,168 B2 | 10/2015 | Chapel |
| 9,175,554 B1 | 11/2015 | Watson |
| 9,206,684 B2 | 12/2015 | Parra |
| 9,322,239 B2 | 4/2016 | Angeles Boza et al. |
| 9,366,114 B2 | 6/2016 | Coli et al. |
| 9,410,410 B2 | 8/2016 | Broussard et al. |
| 9,450,385 B2 | 9/2016 | Kristensen |
| 9,458,687 B2 | 10/2016 | Hallundbaek |
| 9,475,020 B2 | 10/2016 | Coli et al. |
| 9,475,021 B2 | 10/2016 | Coli et al. |
| 9,534,473 B2 | 1/2017 | Morris et al. |
| 9,562,420 B2 | 2/2017 | Morris et al. |
| 9,587,649 B2 | 3/2017 | Oehring |
| 9,611,728 B2 | 4/2017 | Oehring |
| 9,650,871 B2 | 5/2017 | Oehring et al. |
| 9,650,879 B2 | 5/2017 | Broussard et al. |
| 9,728,354 B2 | 8/2017 | Skolozdra |
| 9,738,461 B2 | 8/2017 | DeGaray |
| 9,745,840 B2 | 8/2017 | Oehring et al. |
| 9,840,901 B2 | 12/2017 | Oehring et al. |
| 9,863,228 B2 | 1/2018 | Shampine et al. |
| 9,915,128 B2 | 3/2018 | Hunter |
| 9,932,799 B2 | 4/2018 | Symchuk |
| 9,963,961 B2 | 5/2018 | Hardin |
| 9,976,351 B2 | 5/2018 | Randall |
| 9,995,218 B2 * | 6/2018 | Oehring .................. F02C 7/143 |
| 10,008,880 B2 | 6/2018 | Vicknair |
| 10,196,878 B2 | 2/2019 | Hunter |
| 10,227,854 B2 | 3/2019 | Glass |
| 10,232,332 B2 | 3/2019 | Oehring |
| 10,246,984 B2 | 4/2019 | Payne |
| 10,254,732 B2 | 4/2019 | Oehring |
| 10,260,327 B2 | 4/2019 | Kajaria |
| 10,280,724 B2 | 5/2019 | Hinderliter |
| 10,287,873 B2 | 5/2019 | Filas |
| 10,309,205 B2 | 6/2019 | Randall |
| 10,371,012 B2 | 8/2019 | Davis |
| 10,378,326 B2 | 8/2019 | Morris |
| 10,393,108 B2 | 8/2019 | Chong |
| 10,407,990 B2 | 9/2019 | Oehring |
| 10,436,026 B2 | 10/2019 | Ounadjela |
| 2002/0169523 A1 | 11/2002 | Ross et al. |
| 2003/0056514 A1 | 3/2003 | Lohn |
| 2003/0138327 A1 | 7/2003 | Jones et al. |
| 2004/0040746 A1 | 3/2004 | Niedermayr |
| 2004/0102109 A1 | 5/2004 | Crafty et al. |
| 2004/0167738 A1 | 8/2004 | Miller |
| 2005/0061548 A1 | 3/2005 | Hooper |
| 2005/0116541 A1 | 6/2005 | Seiver |
| 2005/0274508 A1 | 12/2005 | Folk |
| 2006/0052903 A1 | 3/2006 | Bassett |
| 2006/0260331 A1 | 11/2006 | Andreychuk |
| 2007/0131410 A1 | 6/2007 | Hill |
| 2007/0187163 A1 | 8/2007 | Cone |
| 2007/0201305 A1 | 8/2007 | Heilman et al. |
| 2007/0226089 A1 | 9/2007 | DeGaray et al. |
| 2007/0277982 A1 | 12/2007 | Shampine |
| 2007/0278140 A1 | 12/2007 | Mallet et al. |
| 2008/0017369 A1 | 1/2008 | Sarada |
| 2008/0041596 A1 | 2/2008 | Blount |
| 2008/0112802 A1 | 5/2008 | Orlando |
| 2008/0137266 A1 | 6/2008 | Jensen |
| 2008/0208478 A1 | 8/2008 | Ella et al. |
| 2008/0217024 A1 | 9/2008 | Moore |
| 2008/0236818 A1 | 10/2008 | Dykstra |
| 2008/0264625 A1 | 10/2008 | Ochoa |
| 2008/0264640 A1 | 10/2008 | Eslinger |
| 2008/0264649 A1 | 10/2008 | Crawford |
| 2009/0045782 A1 | 2/2009 | Datta |
| 2009/0065299 A1 | 3/2009 | Vito |
| 2009/0078410 A1 | 3/2009 | Krenek et al. |
| 2009/0090504 A1 | 4/2009 | Weightman |
| 2009/0093317 A1 | 4/2009 | Kajiwara et al. |
| 2009/0095482 A1 | 4/2009 | Surjaatmadja |
| 2009/0145611 A1 | 6/2009 | Pallini, Jr. |
| 2009/0153354 A1 | 6/2009 | Daussin et al. |
| 2009/0188181 A1 | 7/2009 | Forbis |
| 2009/0200035 A1 | 8/2009 | Bjerkreim et al. |
| 2009/0260826 A1 | 10/2009 | Sherwood |
| 2009/0308602 A1 | 12/2009 | Bruins et al. |
| 2010/0000508 A1 | 1/2010 | Chandler |
| 2010/0019574 A1 | 1/2010 | Baldassarre et al. |
| 2010/0038907 A1 | 2/2010 | Hunt |
| 2010/0045109 A1 | 2/2010 | Arnold |
| 2010/0051272 A1 | 3/2010 | Loree et al. |
| 2010/0101785 A1 | 4/2010 | Khvoshchev |
| 2010/0132949 A1 | 6/2010 | DeFosse et al. |
| 2010/0146981 A1 | 6/2010 | Motakef |
| 2010/0172202 A1 | 7/2010 | Borgstadt |
| 2010/0200224 A1 | 8/2010 | Nguete |
| 2010/0250139 A1 | 9/2010 | Hobbs et al. |
| 2010/0293973 A1 | 11/2010 | Erickson |
| 2010/0303655 A1 | 12/2010 | Scekic |
| 2010/0322802 A1 | 12/2010 | Kugelev |
| 2011/0005757 A1 | 1/2011 | Hebert |
| 2011/0017468 A1 | 1/2011 | Birch et al. |
| 2011/0061855 A1 | 3/2011 | Case et al. |
| 2011/0085924 A1 | 4/2011 | Shampine |
| 2011/0166046 A1 | 7/2011 | Weaver |
| 2011/0247878 A1 | 10/2011 | Rasheed |
| 2011/0272158 A1 | 11/2011 | Neal |
| 2012/0018016 A1 | 1/2012 | Gibson |
| 2012/0049625 A1 | 3/2012 | Hopwood |
| 2012/0085541 A1 | 4/2012 | Love et al. |
| 2012/0127635 A1 | 5/2012 | Grindeland |
| 2012/0205301 A1 | 8/2012 | McGuire et al. |
| 2012/0205400 A1 | 8/2012 | DeGaray et al. |
| 2012/0222865 A1 | 9/2012 | Larson |
| 2012/0232728 A1 | 9/2012 | Karimi et al. |
| 2012/0247783 A1 | 10/2012 | Berner, Jr. |
| 2012/0255734 A1 | 10/2012 | Coli et al. |
| 2013/0009469 A1 | 1/2013 | Gillett |
| 2013/0025706 A1 | 1/2013 | DeGaray et al. |
| 2013/0175038 A1 | 7/2013 | Conrad |
| 2013/0175039 A1 | 7/2013 | Guidry |
| 2013/0199617 A1 | 8/2013 | DeGaray et al. |
| 2013/0233542 A1 | 9/2013 | Shampine |
| 2013/0306322 A1 | 11/2013 | Sanborn et al. |
| 2013/0341029 A1 | 12/2013 | Roberts et al. |
| 2013/0343858 A1 | 12/2013 | Flusche |
| 2014/0000899 A1 | 1/2014 | Nevison |
| 2014/0010671 A1 | 1/2014 | Cryer et al. |
| 2014/0054965 A1 | 2/2014 | Jain |
| 2014/0060658 A1 | 3/2014 | Hains |
| 2014/0095114 A1 | 4/2014 | Thomeer |
| 2014/0096974 A1 | 4/2014 | Coli |
| 2014/0124162 A1 | 5/2014 | Leavitt |
| 2014/0138079 A1 | 5/2014 | Broussard et al. |
| 2014/0174717 A1 | 6/2014 | Broussard et al. |
| 2014/0219824 A1 | 8/2014 | Burnette |
| 2014/0246211 A1 | 9/2014 | Guidry et al. |
| 2014/0251623 A1 | 9/2014 | Lestz et al. |
| 2014/0255214 A1 | 9/2014 | Burnette |
| 2014/0277772 A1 | 9/2014 | Lopez |
| 2014/0290768 A1 | 10/2014 | Randle |

(56) References Cited

U.S. PATENT DOCUMENTS

| | | |
|---|---|---|
| 2014/0379300 A1 | 12/2014 | Devine et al. |
| 2015/0027712 A1 | 1/2015 | Vicknair |
| 2015/0053426 A1 | 2/2015 | Smith |
| 2015/0068724 A1 | 3/2015 | Coli et al. |
| 2015/0068754 A1 | 3/2015 | Coli et al. |
| 2015/0075778 A1 | 3/2015 | Walters |
| 2015/0083426 A1 | 3/2015 | Lesko |
| 2015/0097504 A1 | 4/2015 | Lamascus |
| 2015/0114652 A1 | 4/2015 | Lestz |
| 2015/0136043 A1 | 5/2015 | Shaaban |
| 2015/0144336 A1 | 5/2015 | Hardin et al. |
| 2015/0159911 A1 | 6/2015 | Holt |
| 2015/0175013 A1 | 6/2015 | Cryer et al. |
| 2015/0176386 A1 | 6/2015 | Castillo et al. |
| 2015/0211512 A1 | 7/2015 | Wiegman |
| 2015/0211524 A1 | 7/2015 | Broussard |
| 2015/0217672 A1 | 8/2015 | Shampine |
| 2015/0225113 A1 | 8/2015 | Lungu |
| 2015/0252661 A1 | 9/2015 | Glass |
| 2015/0300145 A1 | 10/2015 | Coli et al. |
| 2015/0300336 A1 | 10/2015 | Hernandez et al. |
| 2015/0314225 A1 | 11/2015 | Coli et al. |
| 2015/0330172 A1 | 11/2015 | Allmaras |
| 2015/0354322 A1 | 12/2015 | Vicknair |
| 2016/0032703 A1 | 2/2016 | Broussard et al. |
| 2016/0102537 A1 | 4/2016 | Lopez |
| 2016/0105022 A1 | 4/2016 | Oehring |
| 2016/0208592 A1 | 4/2016 | Oehring |
| 2016/0160889 A1 | 6/2016 | Hoffman et al. |
| 2016/0177675 A1 | 6/2016 | Morris et al. |
| 2016/0177678 A1 | 6/2016 | Morris |
| 2016/0186531 A1 | 6/2016 | Harkless et al. |
| 2016/0208593 A1 | 7/2016 | Coli et al. |
| 2016/0208594 A1 | 7/2016 | Coli et al. |
| 2016/0208595 A1 | 7/2016 | Tang |
| 2016/0221220 A1 | 8/2016 | Paige |
| 2016/0230524 A1 | 8/2016 | Dumoit |
| 2016/0230525 A1 | 8/2016 | Lestz et al. |
| 2016/0258267 A1 | 9/2016 | Payne et al. |
| 2016/0265457 A1 | 9/2016 | Stephenson |
| 2016/0273328 A1 | 9/2016 | Oehring |
| 2016/0281484 A1 | 9/2016 | Lestz |
| 2016/0290114 A1 | 10/2016 | Oehring |
| 2016/0290563 A1 | 10/2016 | Diggins |
| 2016/0312108 A1 | 10/2016 | Lestz et al. |
| 2016/0319650 A1 | 11/2016 | Oehring |
| 2016/0326854 A1 | 11/2016 | Broussard |
| 2016/0326855 A1 | 11/2016 | Coli et al. |
| 2016/0341281 A1 | 11/2016 | Brunvold et al. |
| 2016/0348479 A1 | 12/2016 | Oehring |
| 2016/0349728 A1 | 12/2016 | Oehring |
| 2016/0369609 A1 | 12/2016 | Morris et al. |
| 2017/0016433 A1 | 1/2017 | Chong |
| 2017/0021318 A1 | 1/2017 | McIver et al. |
| 2017/0022788 A1 | 1/2017 | Oehring et al. |
| 2017/0022807 A1 | 1/2017 | Dursun |
| 2017/0028368 A1 | 2/2017 | Oehring et al. |
| 2017/0030177 A1 | 2/2017 | Oehring |
| 2017/0030178 A1 | 2/2017 | Oehring et al. |
| 2017/0036178 A1 | 2/2017 | Coli et al. |
| 2017/0036872 A1 | 2/2017 | Wallace |
| 2017/0037717 A1 | 2/2017 | Oehring et al. |
| 2017/0037718 A1 | 2/2017 | Coli et al. |
| 2017/0051732 A1 | 2/2017 | Hemandez et al. |
| 2017/0096885 A1 | 4/2017 | Oehring |
| 2017/0104389 A1 | 4/2017 | Morris et al. |
| 2017/0114625 A1 | 4/2017 | Norris |
| 2017/0146189 A1 | 5/2017 | Herman |
| 2017/0159570 A1 | 6/2017 | Bickert |
| 2017/0218727 A1 | 8/2017 | Oehring |
| 2017/0218843 A1 | 8/2017 | Oehring et al. |
| 2017/0222409 A1 | 8/2017 | Oehring et al. |
| 2017/0226842 A1 | 8/2017 | Omont et al. |
| 2017/0234250 A1 | 8/2017 | Janik |
| 2017/0241221 A1 | 8/2017 | Seshadri |
| 2017/0259227 A1 | 9/2017 | Morris et al. |
| 2017/0292513 A1 | 10/2017 | Haddad |
| 2017/0313499 A1 | 11/2017 | Hughes et al. |
| 2017/0314380 A1 | 11/2017 | Oehring |
| 2017/0314979 A1 | 11/2017 | Ye et al. |
| 2017/0328179 A1 | 11/2017 | Dykstra |
| 2017/0369258 A1 | 12/2017 | DeGaray |
| 2018/0028992 A1 | 2/2018 | Stegemoeller |
| 2018/0038216 A1 | 2/2018 | Zhang |
| 2018/0216455 A1 | 8/2018 | Andreychuk |
| 2018/0245428 A1 | 8/2018 | Richards |
| 2018/0320483 A1 | 11/2018 | Zhang |
| 2018/0363437 A1 | 12/2018 | Coli |
| 2019/0003329 A1 | 1/2019 | Morris |
| 2019/0010793 A1 | 1/2019 | Hinderliter |
| 2019/0063309 A1 | 2/2019 | Davis |
| 2019/0100989 A1 | 4/2019 | Stewart |
| 2019/0112910 A1 | 4/2019 | Oehring |
| 2019/0120024 A1 | 4/2019 | Oehring |
| 2019/0128080 A1 | 5/2019 | Ross |
| 2019/0162061 A1 | 5/2019 | Stephenson |
| 2019/0169971 A1 | 6/2019 | Oehring |
| 2019/0178057 A1 | 6/2019 | Hunter |
| 2019/0178235 A1 | 6/2019 | Coskrey |
| 2019/0203567 A1 | 7/2019 | Ross |
| 2019/0203572 A1 | 7/2019 | Morris |
| 2019/0211661 A1 | 7/2019 | Reckels |
| 2019/0226317 A1 | 7/2019 | Payne |
| 2019/0245348 A1 | 8/2019 | Hinderliter |
| 2019/0292866 A1 | 9/2019 | Ross |
| 2019/0292891 A1 | 9/2019 | Kajaria |
| 2019/0316447 A1 | 10/2019 | Oehring |

FOREIGN PATENT DOCUMENTS

| | | |
|---|---|---|
| CA | 2707269 | 12/2010 |
| CA | 2482943 | 5/2011 |
| CA | 3050131 | 11/2011 |
| CA | 2955706 | 10/2012 |
| CA | 2966672 | 10/2012 |
| CA | 3000322 | 4/2013 |
| CA | 2787814 | 2/2014 |
| CA | 2833711 | 5/2014 |
| CA | 2978706 | 9/2016 |
| CA | 2944980 | 2/2017 |
| CA | 3006422 | 6/2017 |
| CA | 3018485 | 8/2017 |
| CA | 2964593 | 10/2017 |
| CA | 2849825 | 7/2018 |
| CA | 2919649 | 2/2019 |
| CA | 2919666 | 7/2019 |
| CA | 2797081 | 9/2019 |
| CA | 2945579 | 10/2019 |
| CN | 201687513 | 12/2010 |
| CN | 101977016 | 2/2011 |
| CN | 202023547 | 11/2011 |
| CN | 102602322 | 7/2012 |
| JP | 2004264589 | 9/2004 |
| WO | 2016/144939 | 9/2016 |
| WO | 2016/160458 | 10/2016 |

OTHER PUBLICATIONS

International Search Report and Written Opinion dated Sep. 19, 2018 in related PCT Patent Application No. PCT/US2018/040683.

Canadian Office Action dated Sep. 28, 2018 in related Canadian Patent Application No. 2,945,281.

Non-Final Office Action issued in corresponding U.S. Appl. No. 15/486,970 dated Jun. 22, 2017.

Non-Final Office Action issued in corresponding U.S. Appl. No. 15/487,656 dated Jun. 23, 2017.

Non-Final Office Action issued in corresponding U.S. Appl. No. 15/487,694 dated Jun. 26, 2017.

Final Office Action issued in corresponding U.S. Appl. No. 15/294,349 dated Jul. 6, 2017.

Non-Final Office Action issued in corresponding U.S. Appl. No. 14/884,363 dated Sep. 5, 2017.

(56) References Cited

OTHER PUBLICATIONS

Final Office Action issued in corresponding U.S. Appl. No. 15/145,491 dated Sep. 6, 2017.
Non-Final Office Action issued in corresponding U.S. Appl. No. 14/881,535 dated Oct. 6, 2017.
Non-Final Office Action issued in corresponding U.S. Appl. No. 15/145,414 dated Nov. 29, 2017.
Non-Final Office Action issued in corresponding U.S. Appl. No. 15/644,487 dated Nov. 13, 2017.
UK Power Networks—Transformers to Supply Heat to Tate Modern—from Press Releases May 16, 2013.
Non-Final Office Action issued in corresponding U.S. Appl. No. 15/293,681 dated Feb. 16, 2017.
Non-Final Office Action issued in corresponding U.S. Appl. No. 15/294,349 dated Mar. 14, 2017.
Final Office Action issued in corresponding U.S. Appl. No. 15/145,491 dated Jan. 20, 2017.
Non-Final Office Action issued in corresponding U.S. Appl. No. 15/145,443 dated Feb. 7, 2017.
Notice of Allowance issued in corresponding U.S. Appl. No. 15/217,040 dated Mar. 28, 2017.
Notice of Allowance issued in corresponding U.S. Appl. No. 14/622,532 dated Mar. 27, 2017.
Non-Final Office Action issued in corresponding U.S. Appl. No. 15/291,842 dated Jan. 6, 2017.
Final Office Action issued in corresponding U.S. Appl. No. 14/622,532 dated Dec. 7, 2016.
Non-Final Office Action issued in corresponding U.S. Appl. No. 14/622,532 dated May 17, 2016.
Final Office Action issued in corresponding U.S. Appl. No. 14/622,532 dated Dec. 21, 2015.
Non-Final Office Action issued in corresponding U.S. Appl. No. 14/622,532 dated Aug. 5, 2015.
Non-Final Office Action issued in corresponding U.S. Appl. No. 15/145,491 dated Sep. 12, 2016.
Non-Final Office Action issued in corresponding U.S. Appl. No. 15/217,040 dated Nov. 29, 2016.
Non-Final Office Action issued in corresponding U.S. Appl. No. 15/235,788 dated Dec. 14, 2016.
Non-Final Office Action issued in corresponding U.S. Appl. No. 15/145,491 dated May 15, 2017.
Canadian Office Action dated Jun. 22, 2018 in related Canadian Patent Application No. 2,886,697.
Office Action dated Jul. 25, 2018 in related U.S. Appl. No. 15/644,487.
Office Action dated Dec. 12, 2018 in related U.S. Appl. No. 16/160,708.
International Search Report and Written Opinion dated Jan. 2, 2019 in related PCT Patent Application No. PCT/US18/54542.
International Search Report and Written Opinion dated Jan. 2, 2019 in related PCT Patent Application No. PCT/US18/54548.
International Search Report and Written Opinion dated Dec. 31, 2018 in related PCT Patent Application No. PCT/US18/55913.
International Search Report and Written Opinion dated Jan. 4, 2019 in related PCT Patent Application No. PCT/US18/57539.
Non-Final Office Action dated Feb. 12, 2019 in related U.S. Appl. No. 16/170,695.
International Search Report and Written Opinion dated Feb. 15, 2019 in related PCT Application No. PCT/US18/63977.
Non-Final Office Action dated Feb. 25, 2019 in related U.S. Appl. No. 16/210,749.
International Search Report and Written Opinion dated Mar. 5, 2019 in related PCT Application No. PCT/US18/63970.
Non-Final Office Action dated Mar. 6, 2019 in related U.S. Appl. No. 15/183,387.
Office Action dated Mar. 1, 2019 in related Canadian Patent Application No. 2,943,275.
Office Action dated Jan. 30, 2019 in related Canadian Patent Application No. 2,936,997.
Canadian Office Action dated Mar. 2, 2018 in related Canadian Patent Application No. 2,833,711.
Office Action dated Apr. 10, 2018 in related U.S. Appl. No. 15/294,349.
Office Action dated Apr. 2, 2018 in related U.S. Appl. No. 15/183,387.
Office Action dated May 29, 2018 in related U.S. Appl. No. 15/235,716.
Canadian Office Action dated Apr. 18, 2018 in related Canadian Patent Application No. 2,928,711.
International Search Report and Written Opinion dated Apr. 10, 2019 in corresponding PCT Application No. PCT/US2019/016635.
Notice of Allowance dated Apr. 23, 2019 in corresponding U.S. Appl. No. 15/635,028.
Schlumberger, "Jet Manual 23, Fracturing Pump Units, SPF/SPS-343, Version 1.0," Jan. 31, 2007, 68 pages.
Stewart & Stevenson, "Stimulation Systems," 2007, 20 pages.
Luis Gamboa, "Variable Frequency Drives in Oil and Gas Pumping Systems," Dec. 17, 2011, 5 pages.
"Griswold Model 811 Pumps: Installation, Operation and Maintenance Manual, ANSI Process Pump," 2010, 60 pages.
International Search Report and Written Opinion dated Jul. 9, 2019 in corresponding PCT Application No. PCT/US2019/0275E34.
Office Action dated Jun. 11, 2019 in corresponding U.S. Appl. No. 16/210,749.
Office Action dated May 10, 2019 in corresponding U.S. Appl. No. 16/268,030.
Canadian Office Action dated May 30, 2019 in corresponding CA Application No. 2,833,711.
Canadian Office Action dated Jun. 20, 2019 in corresponding CA Application No. 2,964,597.
Office Action dated Jun. 7, 2019 in corresponding U.S. Appl. No. 16/268,030.
International Search Report and Written Opinion dated Sep. 11, 2019 in related PCT Application No. PCT/US2019/037493.
Office Action dated Aug. 19, 2019 in related U.S. Appl. No. 15/356,436.
Office Action dated Oct. 2, 2019 in related U.S. Appl. No. 16/152,732.
Office Action dated Sep. 11, 2019 in related U.S. Appl. No. 16/268,030.
Office Action dated Oct. 11, 2019 in related U.S. Appl. No. 16/385,070.
Office Action dated Sep. 3, 2019 in related U.S. Appl. No. 15/994,772.
Office Action dated Sep. 20, 2019 in related U.S. Appl. No. 16/443,273.
Canadian Office Action dated Oct. 1, 2019 in related Canadian Patent Application No. 2,936,997.
International Search Report and Written Opinion dated Jan. 2, 2020 in related PCT Application No. PCT/US19/55325.
Notice of Allowance dated Jan. 9, 2020 in related U.S. Appl. No. 16/570,331.
Non-Final Office Action dated Dec. 23, 2019 in related U.S. Appl. No. 16/597,008.
Non-Final Office Action dated Jan. 10, 2020 in related U.S. Appl. No. 16/597,014.
Non-Final Office Action dated Dec. 6, 2019 in related U.S. Appl. No. 16/564,186.
International Search Report and Written Opinion dated Nov. 26, 2019 in related PCT Application No. PCT/US19/51018.
International Search Report and Written Opinion dated Feb. 11, 2020 in related PCT Application No. PCT/US2019/055323.
Final Office Action dated Mar. 31, 2020 corresponding to U.S. Appl. No. 15/356,436.
Non-Final Office Action dated Mar. 3, 2020 corresponding to U.S. Appl. No. 16/152,695.

\* cited by examiner

TURBINE CHILLING FOR OIL FIELD POWER GENERATION

CROSS REFERENCE TO RELATED APPLICATIONS

This application is a continuation of U.S. patent application Ser. No. 15/486,970, filed Apr. 13, 2017, now U.S. Pat. No. 9,995,218, issued Jun. 12, 2018, and claims priority to and the benefit of U.S. Provisional Application Ser. No. 62/323,236, filed Apr. 15, 2016, and is a continuation-in-part of, and claims priority to and the benefit of, co-pending U.S. patent application Ser. No. 15/235,788, filed Aug. 12, 2016, which is in turn a continuation-in-part of, and claims priority to and the benefit of, co-pending U.S. patent application Ser. No. 15/202,085, filed Jul. 5, 2016, which is a continuation of, and claims priority to and the benefit of, U.S. patent application Ser. No. 13/679,689, filed Nov. 16, 2012, now U.S. Pat. No. 9,410,410, issued Aug. 9, 2016, the full disclosures of which are hereby incorporated by reference herein for all purposes.

BACKGROUND

1. Technical Field

This disclosure relates generally to hydraulic fracturing and more particularly to systems and methods for improving efficiency of turbine generator operation in order to supply electric power to all components of the hydraulic fracturing operation.

2. Background

With advancements in technology over the past few decades, the ability to reach unconventional sources of hydrocarbons has tremendously increased. Horizontal drilling and hydraulic fracturing are two such ways that new developments in technology have led to hydrocarbon production from previously unreachable shale formations. Hydraulic fracturing (fracturing) operations typically require powering numerous components in order to recover oil and gas resources from the ground. For example, hydraulic fracturing usually includes pumps that inject fracturing fluid down the wellbore, blenders that mix proppant into the fluid, cranes, wireline units, and many other components that all must perform different functions to carry out fracturing operations.

Usually in fracturing systems, the fracturing equipment runs on diesel motors or by other internal combustion engines. Such engines may be very powerful, but have certain disadvantages. Diesel is more expensive, is less environmentally friendly, less safe, and heavier to transport than natural gas. For example, diesel engines are very heavy, and so require the use of a large amount of heavy equipment, including trailers and trucks, to transport the engines to and from a wellsite. In addition, such engines are not clean, generating large amounts of exhaust and pollutants that may cause environmental hazards, and are extremely loud, among other problems. Onsite refueling, especially during operations, presents increased risks of fuel leaks, fires, and other accidents. The large amounts of diesel fuel needed to power traditional fracturing operations require constant transportation and delivery by diesel tankers onto the well site, resulting in significant carbon dioxide emissions.

Some systems have tried to eliminate partial reliance on diesel by creating bi-fuel systems. These systems blend natural gas and diesel, but have not been very successful. It is thus desirable that a natural gas powered fracturing system be used in order to improve safety, save costs, and provide benefits to the environment over diesel powered systems. Turbine use is well known as a power source, but is not typically employed for powering mobile fracturing operations.

Though less expensive to operate, safer, and more environmentally friendly, turbine generators come with their own limitations and difficulties as well. In hot climates with high ambient temperatures in particular, turbine operation efficiency may be compromised. For example, a fleet of turbine equipment with three Taurus 60 generators may be rated to produce 17.1 megawatts (MW) of electricity during normal operating conditions at approximately 55 degrees Fahrenheit. In the summer, when temperatures may reach up to 100 degrees Fahrenheit, and with further power losses from cables, breakers, switchgear, and transformers, the electrical power supply capacity may be below 14.7 MW of electrical power, which is the minimum power required to operate the equipment in accordance with a particular application of fracturing equipment at a well site. Failure to meet the required pump rate against wellhead pressure may result in unsatisfactory well stimulation.

Thus, it may be desirable to modify turbine operation in order to mitigate losses in efficiency, and particularly losses caused by high ambient temperatures.

SUMMARY

Various illustrative embodiments of a system and method for providing turbine chilling for improved oil field power generation are provided herein. In accordance with an aspect of the disclosed subject matter, the method and system of the present disclosure provide a hydraulic fracturing system for fracturing a subterranean formation. In an embodiment, the system can include a plurality of electric pumps fluidly connected to a well associated with the subterranean formation and powered by at least one electric motor, and configured to pump fluid into a wellbore associated with the well at a high pressure so that the fluid passes from the wellbore into the subterranean formation and fractures the subterranean formation; at least one turbine generator electrically coupled to the plurality of electric pumps so as to generate electricity for use by the plurality of electric pumps, each turbine generator having at least one air intake channel; and an air chiller system associated with the at least one turbine generator. In an embodiment, the air chiller system can include a chiller unit configured to chill a fluid, and at least one coil in fluid communication with the chiller unit and positioned adjacent to the at least one air intake channel. In an embodiment, the air chiller system can be configured to increase a power output of the at least one turbine generator.

In an embodiment, the system including the plurality of electric pumps, the at least one turbine generator, and the air chiller system can make up a single electrical micro-grid.

In an embodiment, the system can further include a transformer having a high voltage input in electrical communication with an electrical output of the turbine generator, and a low voltage output, and a step down transformer having an input that is in electrical communication with the low voltage output of the transformer.

In an embodiment, the step down transformer can have an output that is in electrical communication with the air chiller system so as to provide electricity for use by the air chiller system.

In an embodiment, the chilled fluid can be circulated from the chiller unit through the at least one coil, and ambient air can be passed from the at least one air intake channel along an outer surface of the at least one coil and into the at least one turbine generator, such that the air is chilled by the chilled fluid.

In an embodiment, the chilled air can be taken in by the at least one turbine generator so as to increase the power output of the at least one turbine generator.

In an embodiment, the fluid can be returned to the chiller unit after passing through the at least one coil.

In an embodiment, the system can further include a condensation tank, wherein condensation formed on the outer surface of the at least one coil after the chilled fluid is circulated from the chiller unit through the at least one coil is contained in the condensation tank.

In an embodiment, the at least one turbine generator can be powered by natural gas.

In an embodiment, the fluid can include any of water, ammonia, Freon, or a combination thereof.

In an embodiment, each component of the system can be modular and movable to different locations on mobile platforms.

In an embodiment, the system can further include a variable frequency drive connected to the at least one electric motor to control the speed of the at least one electric motor, wherein the variable frequency drive frequently performs electric motor diagnostics to prevent damage to the at least one electric motor.

Various illustrative embodiments of a system and method for providing turbine chilling for improved oil field power generation are provided herein. In accordance with an aspect of the disclosed subject matter, the method and system of the present disclosure provide a hydraulic fracturing system for fracturing a subterranean formation. In an embodiment, the system can include a plurality of electric pumps fluidly connected to a well associated with the subterranean formation and powered by at least one electric motor, and configured to pump fluid into a wellbore associated with the well at a high pressure so that the fluid passes from the wellbore into the subterranean formation and fractures the subterranean formation; a variable frequency drive connected to the at least one electric motor to control the speed of the at least one electric motor, wherein the variable frequency drive frequently performs electric motor diagnostics to prevent damage to the at least one electric motor; at least one turbine generator electrically coupled to the plurality of electric pumps so as to generate electricity for use by the plurality of electric pumps, each turbine generator having at least one air intake channel; and an air chiller system associated with the at least one turbine generator. In an embodiment, the air chiller system can include a chiller unit configured to chill a fluid, and at least one coil in fluid communication with the chiller unit and positioned adjacent to the at least one air intake channel. In an embodiment, the air chiller system can be configured to increase a power output of the at least one turbine generator Other aspects and features of the present disclosure will become apparent to those of ordinary skill in the art after reading the detailed description herein and the accompanying figures.

BRIEF DESCRIPTION OF DRAWINGS

The foregoing aspects, features, and advantage of embodiments of the present disclosure will further be appreciated when considered with reference to the following description of embodiments and accompanying drawings. In describing embodiments of the disclosure illustrated in the appended drawings, specific terminology will be used for the sake of clarity. However, the disclosure is not intended to be limited to the specific terms used, and it is to be understood that each specific term includes equivalents that operate in a similar manner to accomplish a similar purpose.

Figure 1:
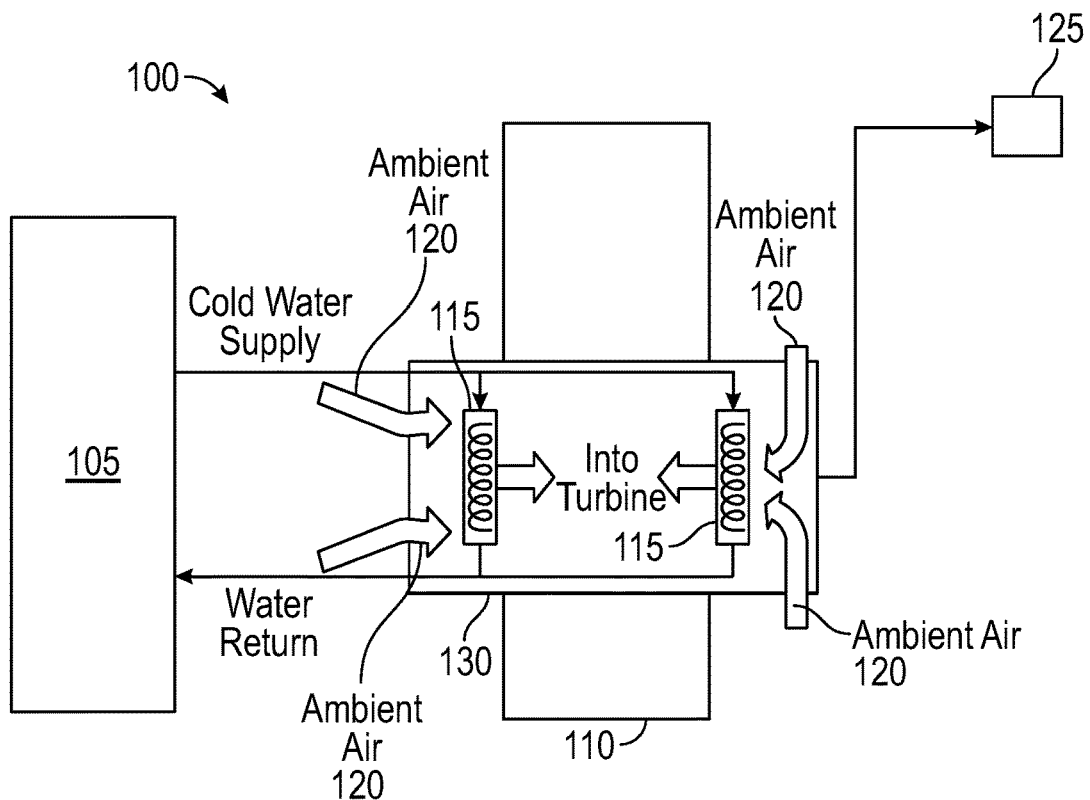
FIG. 1 is an example of operation of a chiller unit in accordance with one embodiment of the disclosure.

While the disclosure will be described in connection with the preferred embodiments, it will be understood that it is not intended to limit the disclosure to that embodiment. On the contrary, it is intended to cover all alternatives, modifications, and equivalents, as may be included within the spirit and scope of the disclosure as defined by the appended claims.

DETAILED DESCRIPTION

The method and system of the present disclosure will now be described more fully hereinafter with reference to the accompanying drawings in which embodiments are shown. The method and system of the present disclosure may be in many different forms and should not be construed as limited to the illustrated embodiments set forth herein; rather, these embodiments are provided so that this disclosure will be thorough and complete, and will fully convey its scope to those skilled in the art. Like numbers refer to like elements throughout. In an embodiment, usage of the term "about" includes +/−5% of the cited magnitude. In an embodiment, usage of the term "substantially" includes +/−5% of the cited magnitude.

It is to be further understood that the scope of the present disclosure is not limited to the exact details of construction, operation, exact materials, or embodiments shown and described, as modifications and equivalents will be apparent to one skilled in the art. In the drawings and specification, there have been disclosed illustrative embodiments and, although specific terms are employed, they are used in a generic and descriptive sense only and not for the purpose of limitation.

Described herein are methods and systems that use chilled air to increase the power output of a gas turbine. During the summer months, or in any hot climates, the production of an electric generator driven by a gas turbine may decrease because of reduced density of ambient air being pulled into the turbine for compression and combustion. Cooling the temperature of the air passing through the intake, such as with an air chilling unit, may increase power output of the turbine generator.

Advantages of air inlet chilling include increased turbine efficiency and decreased equipment cost. In one non-limiting example of use, a fleet of fracturing equipment with three Taurus 60 generators is rated to produce 17.1 MW of electricity during normal operating conditions at approximately 55 degrees. In the summer, when temperatures often reach up to 100 degrees Fahrenheit, the combined turbine output may fall below 13 MW of power. After further power losses from cables, breakers, switchgear, and transformers, the electrical power generation capability is below 14.7 MW of electrical power, which is the minimum power required to operate the equipment in accordance with a particular application of fracturing equipment at a well site. Failure to meet the required pump rate against wellhead pressure may result in unsatisfactory well stimulation.

Adding air chiller units to the fleet of fracturing equipment may cool inlet air temperature at the generators to as low as 38 degrees Fahrenheit, regardless of ambient air temperature. In an example of operation when the inlet air temperature is below normal conditions, a combined electrical power being produced from three turbine generators associated with each turbine air inlet may be at least about 18 MW. Options to increase power generation for oil field equipment may include adding additional generators, which may be diesel or natural gas. However, the cost of adding a fourth turbine generator exceeds twice the cost of using an air chiller unit. Thus, addition of one or more air chiller units represents a cost effective means to improve turbine efficiency.

Natural gas turbine engines are typically more efficient when operating at above 50% or more of a rated load. Generally, the higher the load on the turbine, the more efficient the conversion between fuel consumption and power generation. During a normal hydraulic fracturing operation, the equipment sits idle or at low load for more than half of the time on a well site and is usually at a less than full utilization rate when operating. A typical fracturing operation generally requires multiple turbine generators to supply electricity during times of peak demand. Peak demand may last up to half an hour at a time and generally occurs when wellhead pressure spikes during the end of a fracturing stage. The high pump rate against a high wellhead pressure creates a hydraulic horsepower requirement of up to 16,000 hydraulic horsepower (HHP) in some examples, for example where three 5.7 MW (rated power generation under nominal conditions) turbine generators are used, which requires all available power production on a 60-70 Fahrenheit day. When the full potential of the turbine generators is not required, however, it may be possible to turn off the air inlet chilling which will allow the turbines to run at a higher load, making them more efficient.

Noise dampening is another advantage of employing a chiller unit. In one embodiment, a filter housing for an air inlet to the turbine may be modified to accommodate an air chiller heat exchanger, which provides a barrier to noise that otherwise may escape from the turbine. Further advantages of the system and method described herein include reducing the fracturing system footprint, in that the number of turbines required for an operational fracturing system is less, which in turn lessens the supporting equipment needed. Examples of equipment supporting each turbine include: an electronic equipment room (EER), either a larger or an extra switchgear trailer, an extra natural gas heating and filtering unit, extra power cables, extra communication cables, additional gas lines and gas manifolds, a larger black start generator, and either a larger or an extra gas compressor. Multiple large trailers may be necessary to haul and mount the supporting equipment. Moreover, the support equipment introduces disadvantages of expense, time to assemble/disassemble, extra maintenance, added complications, and increased probability of equipment failure. In contrast, an added chiller unit occupies a single trailer with far fewer cables, and small water lines instead of natural gas lines. Emissions may also be reduced with fewer turbines.

Air inlet chillers as described herein may reduce the number of required turbine generators to produce electricity for a closed circuit microgrid powering a hydraulic fracturing fleet. The electric microgrid efficiency may be increased, and its physical size decreased, by increasing turbine engine output, such as during higher temperature operating conditions. In one example, when the ambient air temperature exceeds around 55 degrees Fahrenheit, the turbines begin producing less than their rated 5.7 MW of power. When the ambient air temperature exceeds around 85 degrees, the turbines may become even less efficient. Some methods of chilling have trouble cooling humid air due to the ambient air already being close to 100% moisture saturation. Chilling methods such as fogging or evaporative cooling are cheaper but cannot cool below wet bulb temperature, which makes them a poor choice for humid climates. These cooling systems also risk exposing the turbine fins to water droplets which may be harmful and reduce the life of the turbine. Fortunately, methods such as vapor compression or vapor absorption may be used for better and non-damaging results. Some turbine manufacturers recommend that inlet air to the turbine not be chilled to below freezing. However, the amount of chilling equipment required to cool air down to that point may be less economical than simply using an additional turbine generator.

Coils in the filter house associated with a turbine generator may obstruct air flow to the turbine and introduce a pressure drop between the air inlet and the turbine, which may reduce turbine performance by up to around 2.0%. The performance drop may be offset by an approximate 5-15% boost in performance from using chiller units to cool the ambient air. The range of 5-15% for the performance increase may be attributable to the refrigeration capacity of the chiller or chillers used, the wet bulb temperature of the ambient air (humidity), and the model of the turbine. However, if the 1-2% drop in performance is unacceptable, intake fans may be added to the coils in the filter house to help draw in outside air to address the pressure drop. Example capacities for the chiller units described herein range from about 450 tons to well over 600 tons of total refrigeration capacity.

In an embodiment, the system can further include a variable frequency drive connected to the at least one electric motor to control the speed of the at least one electric motor. In an embodiment, the variable frequency drive can frequently perform electric motor diagnostics to prevent damage to the at least one electric motor. Variable frequency drives can be utilized for the fracturing equipment in some embodiments, and in other embodiments can be used for pumps and fans required for refrigeration on the chiller units, instead of more commonly used soft starters.

Schematically provided in FIG. 1 is an example 100 of operation of a chiller unit 105 and chilling coils 115 for use with a turbine generator 110 according to one embodiment of the disclosure. In the illustrated embodiment, water or another appropriate fluid (such as ammonia or a Freon mixture, among others) may be cooled by chiller unit 105. Fluid cooling at chiller unit 105 may occur by any known means. Cold water may then be pumped from chiller unit 105 through a chilled water line circuit into one or more chilling coils 115, positioned within a filter house 130 associated with turbine generator 110. At the same time, ambient air may be drawn in through one or more air intake louvers 120 positioned on a periphery of filter house 130, and may pass along the outer surfaces of the one or more chilling coils 115. As the air passes outside the coils 115 and the cold water passes inside the coils 115, heat is exchanged between the chilled coils 115 and the ambient air, thereby cooling the air.

A pump (not shown) may optionally be provided for circulating the water in the cooling system. An example of a chilled water line circuit may include supply and return headers, each having an end connected to the chiller unit 105. The chilled water line circuit may include supply lines that extend from the supply header to the turbine filter house 130, and return lines between the filter house 130 and the return header. Water in the return lines and return header will have warmed up to above the set point of the chiller unit 105 during the thermal exchange with the ambient air, and may be returned to the chiller unit 105 to be cooled back down to the predetermined temperature. Thus water in the supply header and supply lines may be cooler than water in the return lines and return header.

Figure 2A:
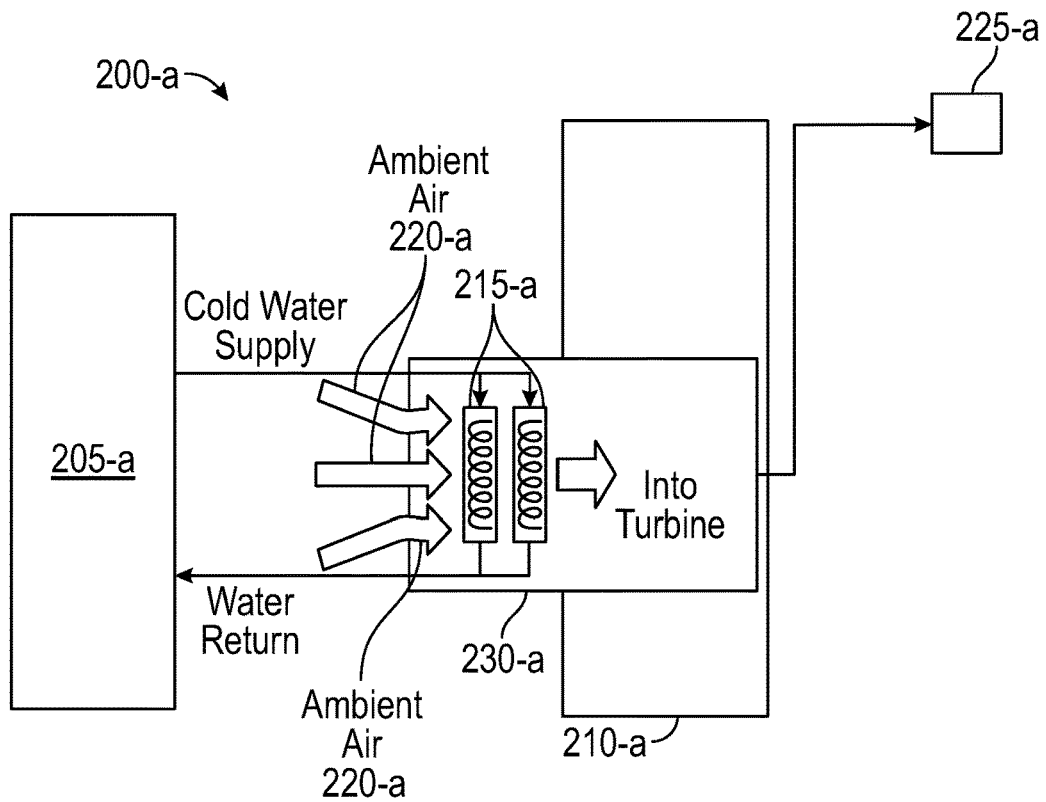
FIGS. 2A-2C are schematic block diagrams of alternate examples of coil and inlet air arrangement in the turbine filter house in accordance with embodiments of the disclosure.
Figure 2B:
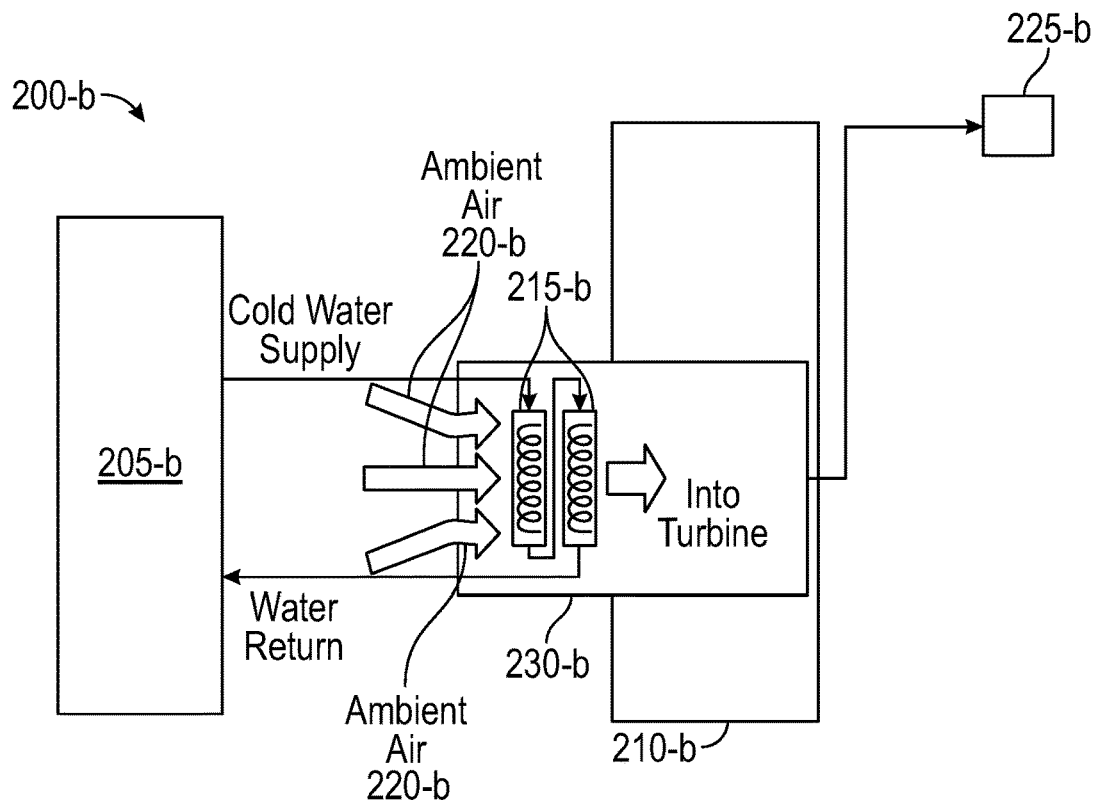
Figure 2C:
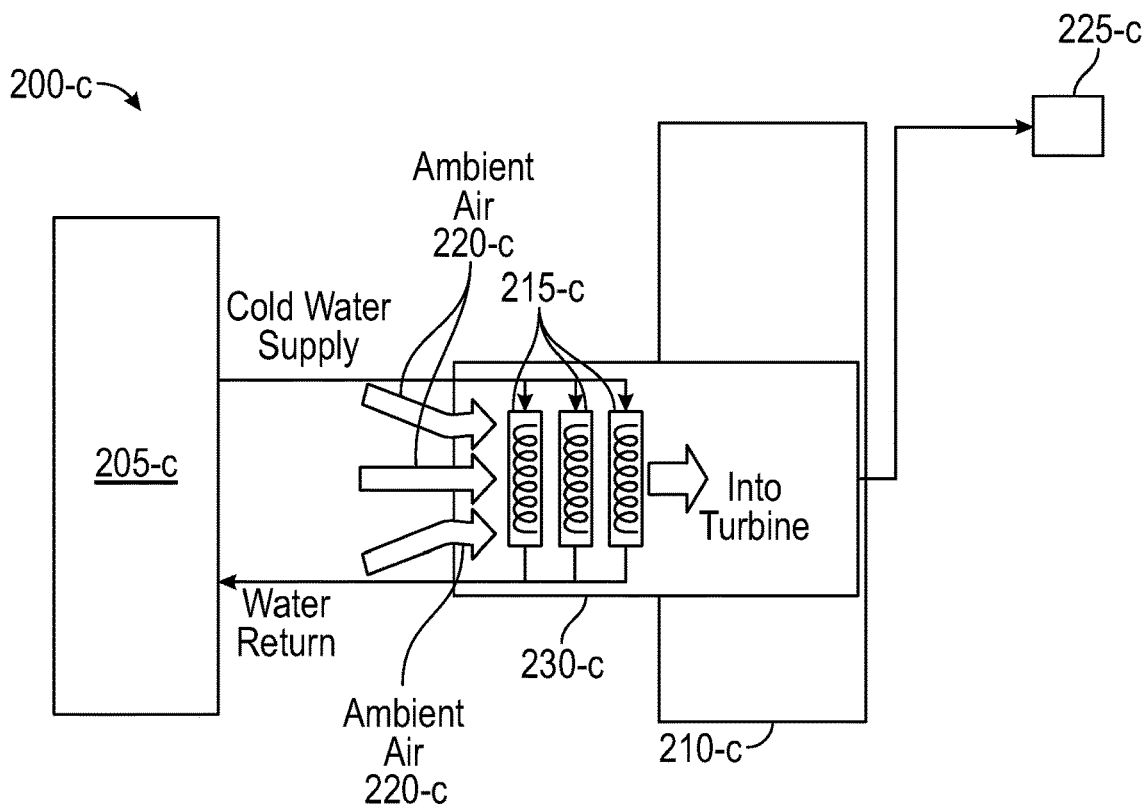

Chilling coils 115 may be positioned inside filter house 130 associated with the turbine generator 110 in some embodiments, or may be positioned elsewhere in the turbine generator system assembly in other embodiments. Though illustrated in FIG. 1 with two chilling coils 115, in various embodiments one, three, or more chilling coils may be utilized. In the embodiment illustrated in FIG. 1, filter house 130 can be positioned centered atop turbine generator 110. The two illustrated chilling coils 115 can be evenly spaced within filter house 130 to balance the filter house 130 on top of the turbine generator 110. This configuration can avoid the need for extra support for the filter house 130. In other embodiments, for example as illustrated in FIGS. 2A-2C, the filter house can be positioned offset from center on the turbine generator, and in some embodiments all coils can be positioned on one side within the filter house, allowing the air inlet filter to be more condensed and lighter in construction, but also causing a weight imbalance and necessitating extra support for the filter house. Extra support can include support from the EER enclosure in some examples, or can include use of one or more vertical support pillars in other examples. Other various configurations are also envisioned.

The chilling coils 115 may be disposed in the path of ambient air that is being drawn into the filter house 130 via the plurality of air intake louvers 120 for combustion in the turbine 110. Cold water circulates through the chilling coils 115 so that thermal energy in the ambient air is transferred to the cold water to cool the ambient air. In one example, the water temperature is around 40 degrees Fahrenheit; the temperature may depend on the ambient air temperature and humidity. In one example, a higher air temperature and more humid ambient air requires lower temperature water to pass through the chilling coils. A greater amount of energy may be imparted into the turbine by combusting air that is chilled, dry, and dense, rather than air that is warm, moist, and has a low density.

In one non-limiting example of use, the chiller unit 105 may refrigerate water or any other appropriate fluid to a set temperature point, which may be predetermined and in one embodiment may be around 40 degrees Fahrenheit. In the illustrated example, chilling coils 115 in the turbine filter house 130 act as a dehumidifier to condense moisture from the air being fed to the turbine generator 110. The condensate from the filter house 130 may be collected and deposited into a dedicated condensation holding tank 125 for disposal via a drain line.

In some embodiments, the collective system formed by the chiller unit 105, cold water supply channel, coils 115, and water return channel may form a closed-loop system. In other embodiments, the collective system may be open.

FIGS. 2A through 2C show schematic block diagrams 200-a, 200-b, 200-c of alternate examples of coil and inlet air arrangement in the turbine filter house. In these alternate designs, ambient air enters the filter house 230-a, 230-b, 230-c through one or more air intake louvers 220-a, positioned on a periphery of the filter house 230-a, 230-b, 230-c. This arrangement may require a small support (not shown) to help hold up the unbalanced filter house 230-a, 230-b, 230-c. In one embodiment, the filter house weight is less than 12,000 pounds, with most of the weight being supported by the turbine generator structure 210-a, 210-b, 210-c.

Referring specifically to FIG. 2A, water or another appropriate fluid may be chilled at chiller unit 205-a, and may pass through a cold water supply channel to one or more coils 215-a. In the illustrated example, the coils 215-a may receive the cold water from the chiller unit 205-a in a parallel arrangement, such that a portion of the cold water flows through each of the coils 215-a before returning to the chiller unit 205-a via the water return channel. Simultaneously, ambient air may be drawn into the filter house 230-a via one or more air intake louvers 220-a positioned on a periphery of the filter house 230-a, and may be passed along the outer surfaces of the coils 215-a. As the cold water circulates through the chilling coils 215-a, thermal energy in the ambient air is transferred to the cold water to cool the ambient air and slightly warm the cold water. The cooled air may then be passed down into the turbine generator to power the turbine.

Although illustrated in FIG. 2A as having two coils 215-a, in various embodiments one, three, or more coils may be used.

FIG. 2B illustrates an alternate embodiment, in which the coils 215-b are positioned in a series arrangement. In this configuration, cold water supplied by chiller unit 205-b may pass through each of the coils 215-b in series before returning to the chiller unit 205-b.

In another alternate embodiment, FIG. 2C illustrates use of three coils 215-c, positioned in parallel, to receive the cold water and cool the ambient air. In alternate embodiments, the three coils 215-c may be positioned in series, or in any combination of series and parallel.

Figure 3:
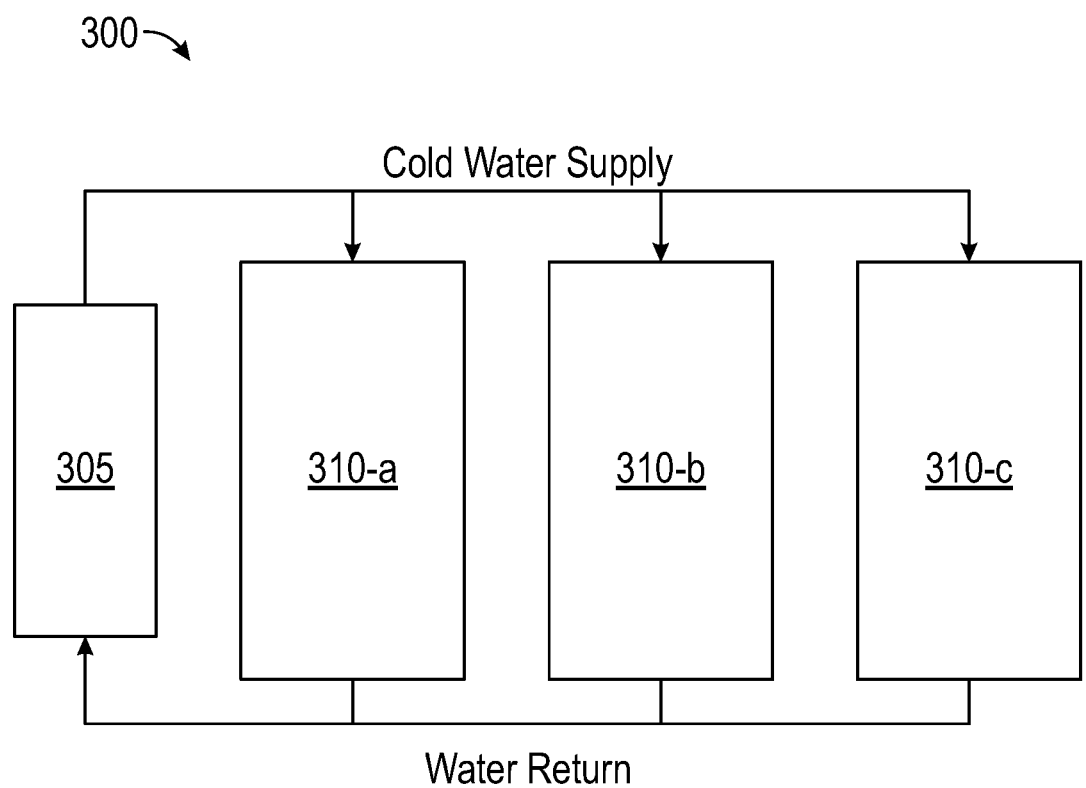
FIG. 3 is a schematic block diagram of an example of a power generation system having air inlet cooling in accordance with an embodiment of the disclosure.

Shown in schematic block diagram form in FIG. 3 is one example 300 of an air inlet cooling system used to cool ambient air for use by three turbine generators 310-a, 310-b, 310-c. In the illustrated example, water or another appropriate fluid may be cooled at chiller unit 305, then passed through a cold fluid supply channel to one or more coils (not shown) positioned within or near each of turbine generators 310-a, 310-b, 310-c in parallel before returning to the chiller unit 305 to be re-chilled. As illustrated in more detail in FIGS. 1 and 2A-C, ambient air may be drawn into a filter house associated with each turbine generator 310-a, 310-b, 310-c through one or more air intake louvers and passed along the outer surface of one or more coils positioned in the filter house (not shown). In addition to cooling the ambient air, moisture in the air may be condensed onto the coil as the air is cooled, which dries the air and allows for a more efficient combustion by the turbine generators 310-a, 310-b, 310-c, producing more power in hot weather and climates.

In one embodiment, a chiller unit 305 may be mounted on a 48-foot trailer with a total dry weight of less than 50,000 pounds (lbs), and with a life expectancy of around 10 to 12 years of oil field duty. Example chiller units may have a capacity of 450 tons of refrigeration (5,400,000 British thermal units per hour (BTU/hr)), may be powered by 600 volts (V) electricity, and consume up to 600 kilowatts (kW). In other embodiments, alternate configurations are envisioned.

Figure 4A:
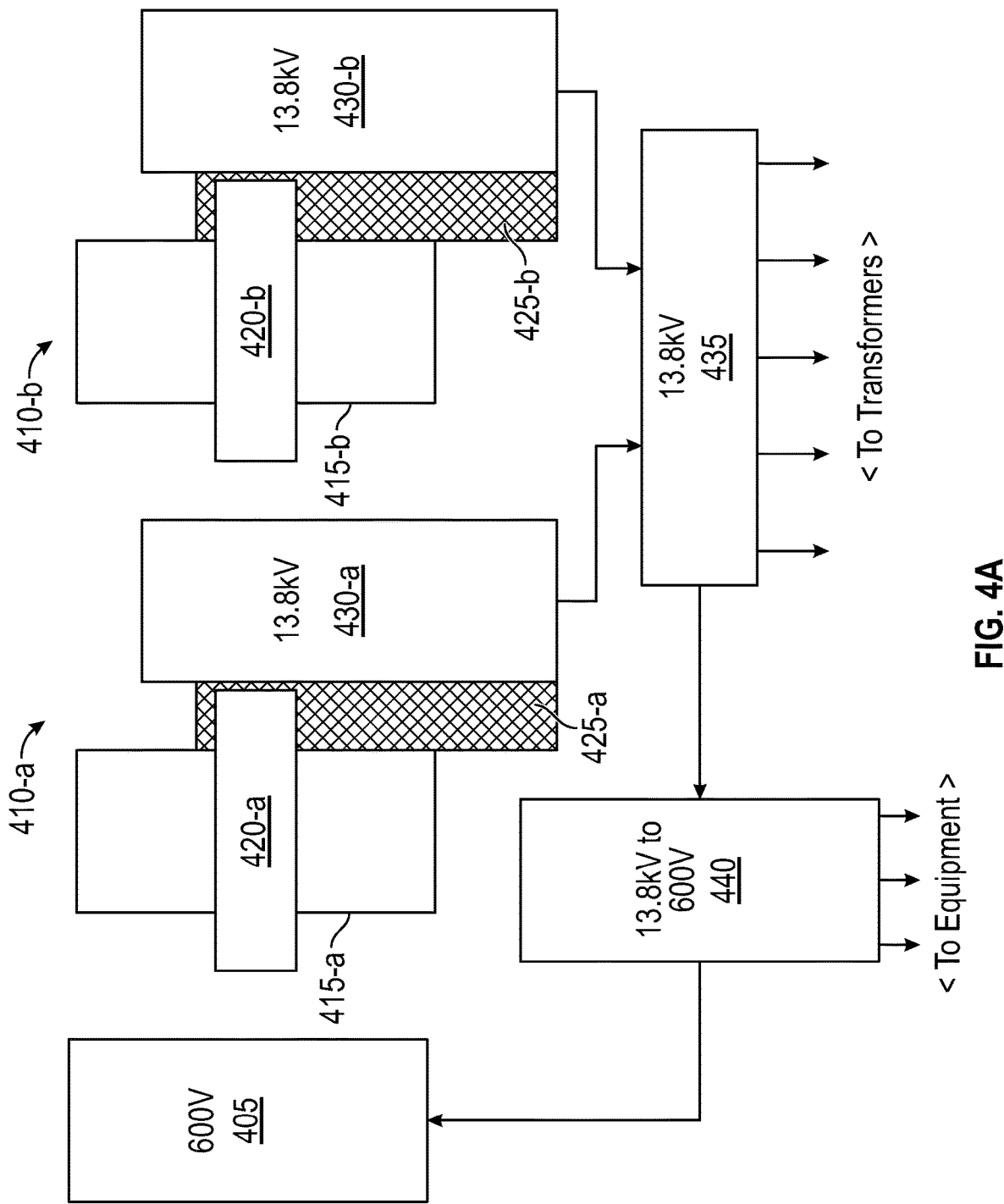
FIGS. 4A-4C are schematic block diagrams of alternate examples of powering a chiller unit.

FIG. 4A shows a block diagram example 400-*a* of powering a chiller unit 405. As shown, 600 V of electrical power is supplied to the chiller unit 405 from an auxiliary unit 440, which also supplies power to mixing equipment, such as a blender and a hydration unit (not shown) for use in hydraulic fracturing. A turbine generator 415-*a*, 415-*b*, an electronic equipment room (EER) 430-*a*, 430-*b*, and a switchgear trailer 435 form the basic components of the system. The turbine generator 415-*a*, 415-*b* may include a natural gas turbine engine coupled to a three-phase, 60 Hz, electric generator that rotates to produce power. The turbine generator 415-*a*, 415-*b* may be electrically connected to the EER 430-*a*, 430-*b*, which provides any of wiring, breakers, controls, monitoring, fire suppression support, and a battery bank for secondary power when the turbine generator 415-*a*, 415-*b* is not running or when no other power source is connected. The combination of the turbine generator 415-*a*, 415-*b* and the EER 430-*a*, 430-*b* may be referred to as a generator set 410-*a*, 410-*b*. Each generator set 410-*a*, 410-*b* is also illustrated as having an optional elevated walkway ("catwalk") 425-*a*, 425-*b* extending between each turbine generator 415-*a*, 415-*b* and associated EER 430-*a*, 430-*b*. A filter house 420-*a*, 420-*b* associated with each generator set 410-*a*, 410-*b* may house the air intake louvers and cooling coils described in more detail above with respect to FIGS. 1-3.

In the illustrated example, a switchgear trailer 435 may be used to provide power distribution, high voltage breakers, and lock-out, tag-out capabilities. The switchgear trailer 435, together with the turbine generator 415-*a*, 415-*b* and EER 430-*a*, 430-*b*, and optionally with transformers, may form an electrical microgrid. While a pair of generator sets 410-*a*, 410-*b* is illustrated in FIG. 4A, the quantity of generator sets may be more or less, as only one is needed to form an electrical microgrid. A switchgear trailer 435 is shown in electrical communication with the generator sets 410-*a*, 410-*b* and the auxiliary unit 440. In an example, a single auxiliary unit 440 is provided for every two to four generator sets 410-*a*, 410-*b*, and may depend on a particular application.

In this embodiment, the switchgear trailer 435 is used as an electrical power hub and provides breakers for safety and switching. Lines to and from the switchgear trailer 435 represent electrical cables carrying 13.8 kV power, which is distributed to transformers (not shown) for pumping equipment, such as fracturing pumps (not shown) and auxiliary units 440. Power may then be stepped down to 600 V by the transformers or auxiliary unit 440 (which may contain a transformer). Lines from the auxiliary unit 440 to the chiller unit 405 and to the equipment represent 600 V power cables. The chiller unit 405 as shown is powered by 600 V from auxiliary unit 440. In this way, powering the chiller unit may occur in a closed, single electrical microgrid system.

As indicated above, the auxiliary unit 440 provides 600 V electrical power and electric motor control to mixing equipment on the hydraulic fracturing fleet in one embodiment. The chiller unit 405 may have onboard motor controls such that only 600 V electrical power is supplied by auxiliary unit 440 to chiller unit 405. Thus a 13.8 kV to 600 V step-down transformer may provide necessary electrical power to chiller unit 405, and optionally a transformer may be provided in lieu of the auxiliary unit 440. The cable layout and concept may not be altered in that option. In the example of FIG. 4A, all electrical power is three-phase AC power. All electrical cables used have an electrical ground and ground check included, have heavy duty insulation, and may be routed along the ground.

Figure 4B:
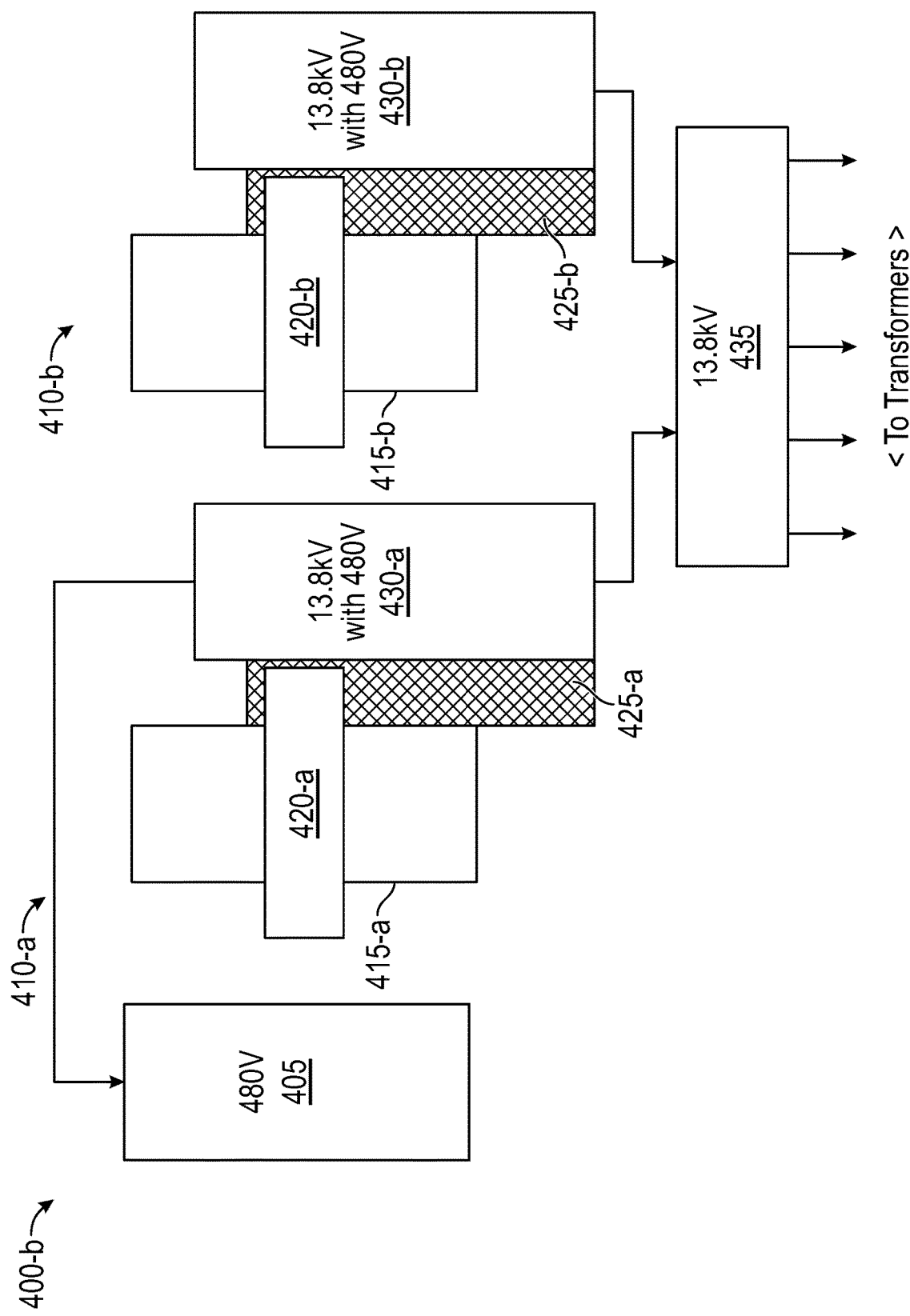

FIG. 4B shows a schematic block diagram 400-*b* of an alternate power configuration. In the illustrated example, generator sets 410-*a*, 410-*b* may provide 13.8 kV power to the microgrid, and may include a 480 V transformer to provide power to compressors, filters, heaters, and other electronics. The 480 V transformer may be used to power chiller unit 405, which may be designed to be powered by 480 V in this embodiment, rather than by 600 V as described in previous embodiments. Line spanning the first EER 430-*a* and the chiller unit 405 may represent a 480 V power cable. This configuration will also allow the chiller unit 405 to be powered by a black start generator (not shown), which can be a diesel generator used to start the turbine generator sets 410-*a*, 410-*b* and to power the EERs 430-*a*, 430-*b* before the turbines are self-sufficient to the point of providing power to the microgrid.

Figure 4C:
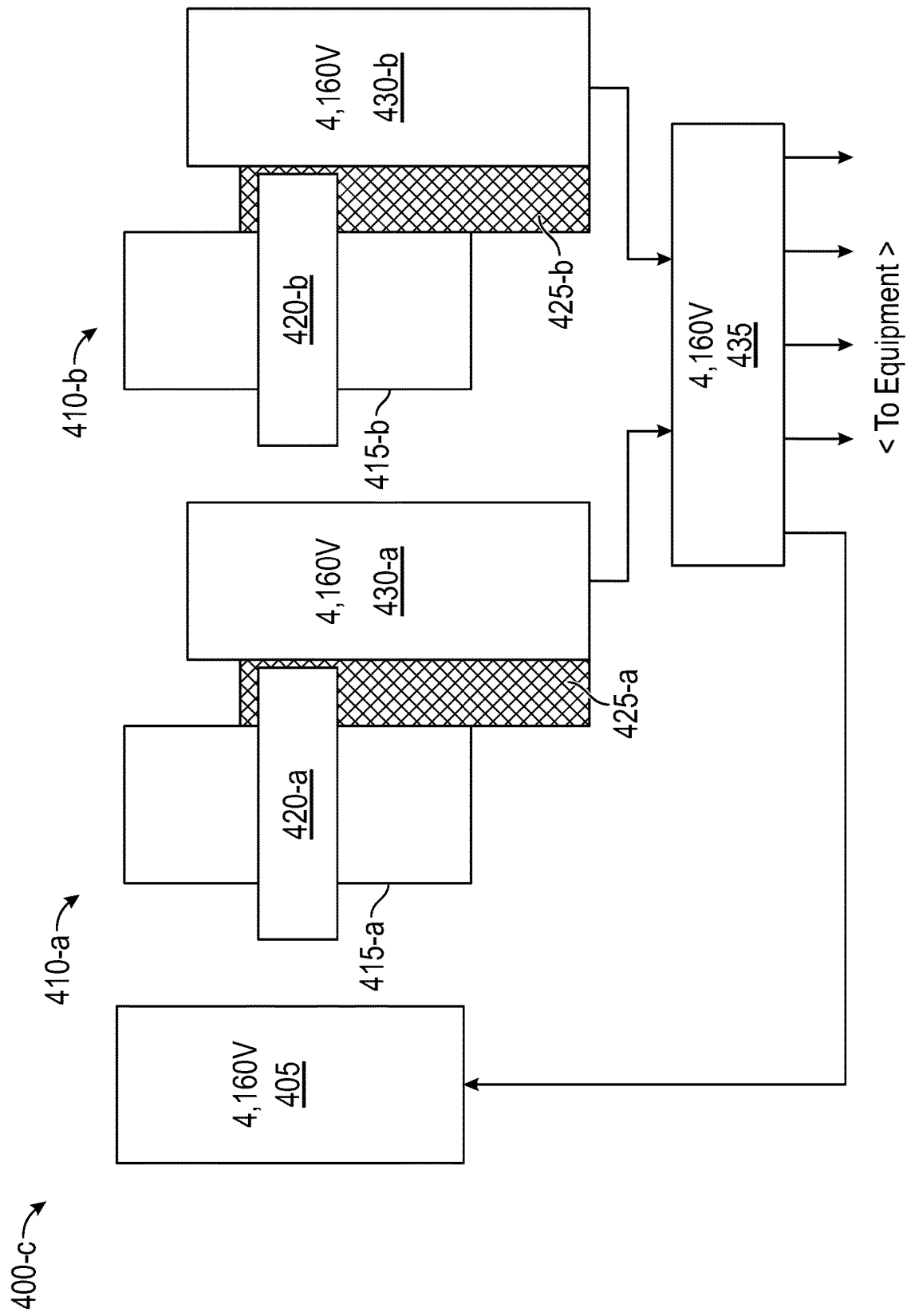

Illustrated in FIG. 4C is a schematic block diagram 400-*c* of another alternate system for supplying power. In this example, the turbines 415-*a*, 415-*b* produce electricity at 4,160 V, and the chiller unit 405 may be powered with this same voltage, without the need for a large three-phase power transformer. However, it is important to note that even for a 4,160 V microgrid, it will still be possible to use a transformer or auxiliary trailer to power a chiller unit 405 designed for 480 V or 600 V.

In any embodiment, silencers may be included in the filter house 420-*a*, 420-*b* to reduce noise emanating from the turbine 415-*a*, 415-*b*. In alternate embodiments the silencer is not required for the air inlet chilling system to work properly, and may be omitted.

Although illustrated in FIGS. 1-4 as having a single chiller unit, in alternate embodiments multiple chiller units may be utilized with sets of turbine generators. In some embodiments, multiple turbines may be utilized with multiple chillers. The chiller units may be designed to be modular such that excess chiller units may be easily removed from, or additional chiller units may be easily added to, a hydraulic fracturing system site without compromising operation of the system. In certain situations it may become more economical to use a multitude of smaller turbines, or due to equipment and power requirements a fleet of large turbines may be required.

One embodiment (not illustrated) may include two chiller units and six generator sets. The chiller units may be independent from each other, each supplying chilled fluid to a dedicated bank of turbines; or chiller units may be slaved together to provide cold water as though they were a single unit. It should be pointed out that the physical layout of these generator sets and chiller units is not limited to that of the figures, but may be in any orientation or manner, and may be dependent on the size and shape of a particular job site. In another embodiment, not every turbine onsite requires a chiller unit. Instead, some turbines may be associated with a chiller unit as illustrated above, and other turbines that form part of a fracturing system may not be associated with a chiller unit, but may operate without cooled inlet air and possibly at a reduced power output.

A preferred fluid being circulated through the chiller units and the filter house coils may include clean tap water. Additives such as glycol or antifreeze may be included to keep the water from freezing if required to circulate fluid below the freezing point of water. Detergents, chlorine, or anticorrosion agents may also be added to the water or fluid to clean or unclog the fluid lines and coils.

In one example of operation, a 450 ton capacity chiller unit may have a maximum power draw of 600 kW at 600 V three-phase AC. Larger and smaller units may be built, which may be dependent on the climate and cooling requirements, and may have a different maximum power draw. In an example with two units, a total maximum power draw may be 1,200 kW, which is 600 kW for each of the two chiller units. Example cables for use with the system include diesel locomotive cable (DLO cable), which may be routed along the ground between the equipment. Embodiments exist where two cables for each power phase are used, which may total six power cables for three-phase power. This configuration allows cables to be smaller, lighter, and easier to manage. An equipment ground spanning between the chiller unit and power source may be used, which results in seven single conductor DLO cables per 450 ton chiller unit. However, many possible cable configurations exist. A single cable per phase may be used in some embodiments, or three or more cables per phase may be used in other embodiments.

It is also possible to use multiconductor cables. These cables may include all three phases and an internal ground. A single multiconductor cable may be used, or several multiconductor cables may be used, to split the power load so that cables may be lighter and smaller. These multiconductor cables may have an internal ground and ground check, or the grounds may be external. These power cables may extend along the ground between equipment. The cables may also be suspended like power transmission lines, and could also use non-insulated cables in that situation. Alternatively the cables may be buried underground so they are out of sight and are not trip hazards.

Equipment may be mobile and trailer mounted. It is also possible to make mobile skid-mounted chiller units or bodyload units where the chilling equipment is permanently mounted to a truck frame. The chiller units and filter houses may be designed to cool inlet air for Solar Taurus 60 turbines. The specific turbine is not a requirement, however, and the air inlet chilling system may be designed to work with any turbines, larger or smaller, with minor changes. The chiller unit may contain variable frequency drives (VFDs) to control the fan motors and refrigeration capacity. This is a more expensive option that may be useful for adjusting the cooling output automatically to keep the turbine load higher and to create more efficient power generation. It is also possible to simply use soft starters to run to electric motors, which is an "on or off" mode of operation and is cheaper and simpler. However, it is more difficult to adjust the output of the chiller unit by this means.

The microgrid utilizing turbine generators with air inlet chilling may be used to provide power to hydraulic fracturing equipment in all of the previous examples. This technology of efficient power generation using a closed circuit microgrid may be used for all oilfield applications, including electric drilling rigs, workover rigs, compressor stations, wireline equipment, coil tubing equipment, production equipment, isolated industrial sites, and any other applications requiring sufficient electrical power while also being positioned far from consumer power grids, having inductive loads, or having varying power demands.

Figure 5:
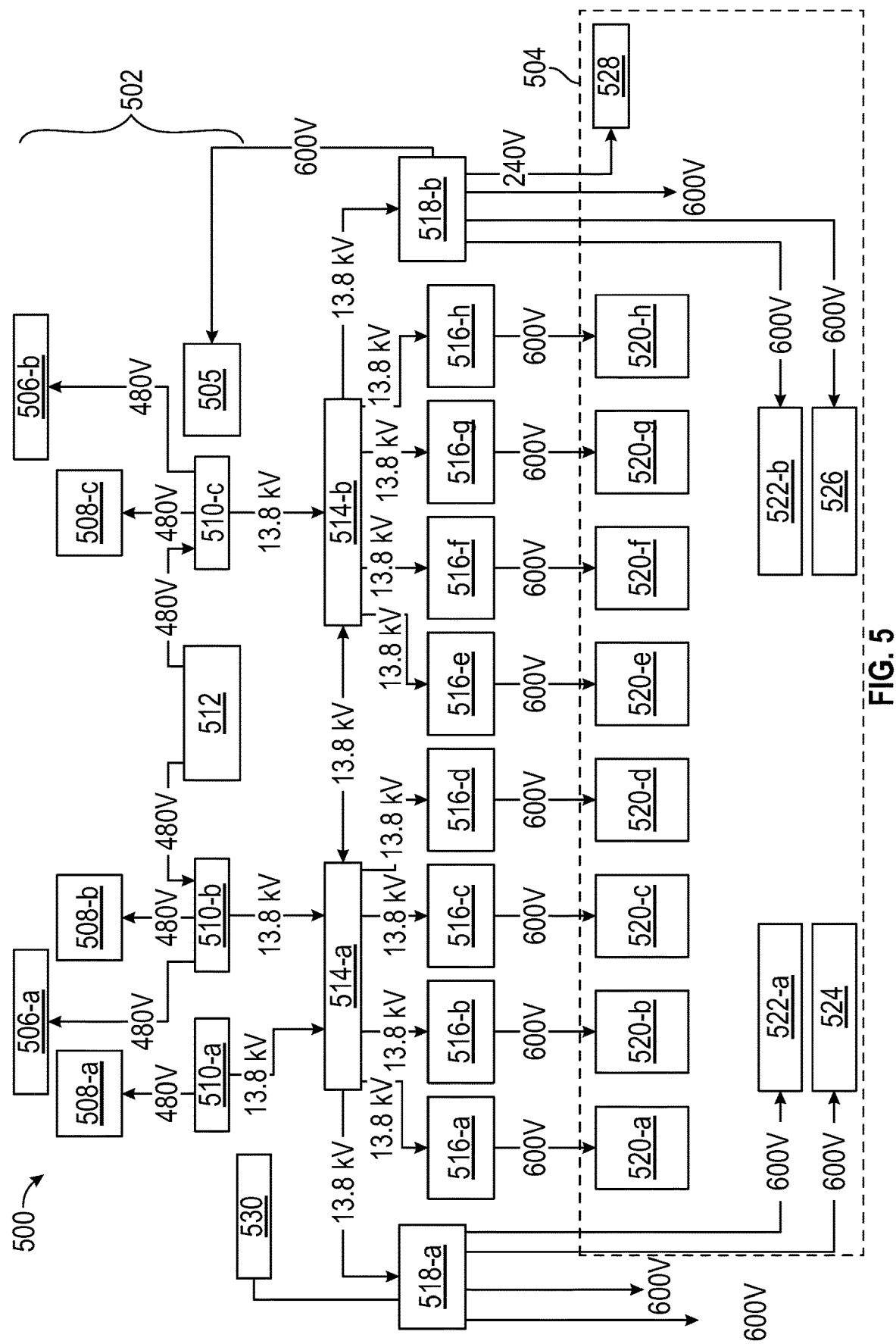
FIG. 5 is a schematic block diagram of a hydraulic fracturing system having a chiller.

FIG. 5 shows a block diagram of an example 500 of a hydraulic fracturing system which uses a single chiller unit 505 to boost the output from three turbine generators 510-*a*, 510-*b*, 510-*c*. The power generation equipment may be capable of supplying power to operate an 18,000+ HHP (hydraulic horsepower) fleet of hydraulic fracturing equipment in any season and in any climate with fewer turbines than would be necessary in summer months. In some embodiments, ambient temperatures may exceed 100 degrees Fahrenheit and 100% humidity without derating the turbines if 600 tons of refrigeration capacity is available from the chiller unit.

A fracturing system 500 at a well site is shown with a power generation system 502 and fracturing equipment 504. In this example, the power generation system 502 contains three natural gas powered turbine sets 510-*a*, 510-*b*, 510-*c* that may have one or more turbines apiece, where each turbine is accompanied by an electronic equipment and control room (EER). In the illustrated example, the turbine sets 510-*a*, 510-*b*, 510-*c* provide electrical power to switchgears 514-*a*, 514-*b*, which in turn monitor and control electrical power provided to transformers 516-*a*, 516-*b*, 516-*c*, 516-*d*, 516-*e*, 516-*f*, 516-*g*, 516-*h*. The turbine sets 510-*a*, 510-*b*, 510-*c* may be supplied with natural gas onsite, and as their turbines spin they may generate electric power in the range from around 4180 V to around 15 kV. Any well known, natural gas powered turbine suitable to provide this amount or another similar potential of electricity is included in this disclosure. The turbine sets 510-*a*, 510-*b*, 510-*c* may be electrically independent and run in tandem so that in case one or more turbine loses power due to an overload, the other(s) will not shut down, thereby avoiding the sand slurry dropping out of fluid suspension in the wellbore. In some examples, the turbine sets 510-*a*, 510-*b*, 510-*c* may be initially powered by black start generator 512.

The transformers 516-*a*, 516-*b*, 516-*c*, 516-*d*, 516-*e*, 516-*f*, 516-*g*, 516-*h* may step down the voltage from 13.8 kV to 600 V and provide power to the twin fracturing pump trailers 520-*a*, 520-*b*, 520-*c*, 520-*d*, 520-*e*, 520-*f*, 520-*g*, 520-*h*. The pump trailers 520-*a*, 520-*b*, 520-*c*, 520-*d*, 520-*e*, 520-*f*, 520-*g*, 520-*h* may include electric motors (not shown), which in one example operate at 600 V each. The auxiliary trailers 518-*a*, 518-*b* may take the electricity at 13.8 kV from the switchgears 514-*a*, 514-*b* and provide 600 V to data van 528, sand equipment 526, hydration unit 524, blenders 522-*a*, 522-*b*, or substation 530, as well as to chiller unit 505. The auxiliary trailers 518-*a*, 518-*b* may also include transformers for stepping down the voltage.

The present disclosure described herein, therefore, is well adapted to carry out the objects and attain the ends and advantages mentioned, as well as others inherent therein. While a presently preferred embodiment of the disclosure has been given for purposes of disclosure, numerous changes exist in the details of procedures for accomplishing the desired results. These and other similar modifications will readily suggest themselves to those skilled in the art, and are intended to be encompassed within the spirit of the present disclosure disclosed herein and the scope of the appended claims.

What is claimed is:

1. A hydraulic fracturing system for fracturing a subterranean formation comprising:
a plurality of electric pumps fluidly connected to a well associated with the subterranean formation and powered by at least one electric motor, and configured to pump fluid into a wellbore associated with the well at a high pressure so that the fluid passes from the wellbore into the subterranean formation and fractures the subterranean formation;
at least one turbine generator electrically coupled to the plurality of electric pumps so as to generate electricity for use by the plurality of electric pumps, each turbine generator having at least one air intake channel;

a transformer having a primary voltage input in electrical communication with an electrical output of the turbine generator; and
an air chiller system associated with the at least one turbine generator, the air chiller system comprising:
a chiller unit configured to chill a fluid; and
at least one coil in fluid communication with the chiller unit;
wherein the system comprising the plurality of electric pumps, the at least one turbine generator, and the air chiller system comprises a single electrical micro-grid.

2. The system of claim 1, further comprising a second transformer having an input that is in electrical communication with a secondary voltage output of the transformer.

3. The system of claim 2, wherein the second transformer has an output that is in electrical communication with the air chiller system so as to provide electricity for use by the air chiller system.

4. The system of claim 1, wherein the chilled fluid is circulated from the chiller unit through the at least one coil, and wherein ambient air is passed from the at least one air intake channel along an outer surface of the at least one coil and into the at least one turbine generator, such that the air is chilled by the chilled fluid.

5. The system of claim 4, wherein the chilled air is taken in by the at least one turbine generator so as to increase the power output of the at least one turbine generator.

6. The system of claim 4, wherein the fluid is returned to the chiller unit after passing through the at least one coil.

7. The system of claim 4, further comprising a condensation tank, wherein condensation formed on the outer surface of the at least one coil after the chilled fluid is circulated from the chiller unit through the at least one coil is contained in the condensation tank.

8. The system of claim 1, wherein the at least one turbine generator is powered by natural gas.

9. The system of claim 1, wherein the fluid comprises any of water, ammonia, Freon, or a combination thereof.

10. The system of claim 1, wherein each component of the system is modular and movable to different locations on mobile platforms.

11. The system of claim 1, further comprising:
a variable frequency drive connected to the at least one electric motor to control the speed of the at least one electric motor.

12. A hydraulic fracturing system for fracturing a subterranean formation comprising:
a plurality of electric pumps fluidly connected to a well associated with the subterranean formation and powered by at least one electric motor, and configured to pump fluid into a wellbore associated with the well at a high pressure so that the fluid passes from the wellbore into the subterranean formation and fractures the subterranean formation;
a variable frequency drive connected to the at least one electric motor to control the speed of the at least one electric motor;
at least one turbine generator electrically coupled to the plurality of electric pumps so as to generate electricity for use by the plurality of electric pumps; and
an air chiller system associated with the at least one turbine generator, the air chiller system comprising:
a chiller unit configured to chill a fluid; and
at least one coil in fluid communication with the chiller unit;
wherein the system comprising the plurality of electric pumps, the at least one turbine generator, and the air chiller system comprises a single electrical micro-grid.

13. The system of claim 12, further comprising:
a transformer having a high voltage input in electrical communication with an electrical output of the turbine generator, and a low voltage output; and
a step down transformer having an input that is in electrical communication with the low voltage output of the transformer.

14. The system of claim 13, wherein the step down transformer has an output that is in electrical communication with the air chiller system so as to provide electricity for use by the air chiller system.

15. The system of claim 12, wherein the chilled fluid is circulated from the chiller unit through the at least one coil, and wherein ambient air is passed from at least one air intake channel of the at least one turbine generator along an outer surface of the at least one coil and into the at least one turbine generator, such that the air is chilled by the chilled fluid.

16. The system of claim 15, wherein the chilled air is taken in by the at least one turbine generator so as to increase the power output of the at least one turbine generator.

17. The system of claim 15, wherein the fluid is returned to the chiller unit after passing through the at least one coil.

18. The system of claim 15, further comprising a condensation tank, wherein condensation formed on the outer surface of the at least one coil after the chilled fluid is circulated from the chiller unit through the at least one coil is contained in the condensation tank.

* * * * *